US012249126B2

(12) United States Patent
Laubscher et al.

(10) Patent No.: US 12,249,126 B2
(45) Date of Patent: Mar. 11, 2025

(54) TRAINING DATA GENERATION WITH GENERATIVE MODELING

(71) Applicant: California Institute of Technology, Pasadena, CA (US)

(72) Inventors: Emily C. Laubscher, Pasadena, CA (US); Nitzan Razin, Berkeley, CA (US); David A. Van Valen, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 333 days.

(21) Appl. No.: 17/679,115

(22) Filed: Feb. 24, 2022

(65) Prior Publication Data

US 2022/0284697 A1 Sep. 8, 2022

Related U.S. Application Data

(60) Provisional application No. 63/153,215, filed on Feb. 24, 2021.

(51) Int. Cl.
*G06T 7/00* (2017.01)
*G06V 10/762* (2022.01)
*G06V 10/774* (2022.01)
*G06V 10/776* (2022.01)

(52) U.S. Cl.
CPC .......... *G06V 10/774* (2022.01); *G06V 10/762* (2022.01); *G06V 10/776* (2022.01)

(58) Field of Classification Search
CPC ...... G06F 17/15; G06F 18/2415; G06F 18/21; G06F 18/22; G06T 2207/20081; G06T 2207/20084; G06T 7/11; G06T 7/194; G06T 2207/20132; G06T 7/187; G06T 7/0004; G06T 5/90; G06T 2207/30132; G06T 7/10; G06T 7/12; G06T 7/13; G06T 2207/20076; G06V 10/82; G06V 10/774; G06V 10/454; G06V 20/58; G06V 10/26; G06V 20/176; G06V 2201/07; G06V 10/267; G06V 10/462; G06V 10/44; G06V 20/56; G06V 20/70; G06V 10/50; G06V 10/764

See application file for complete search history.

(56) References Cited

U.S. PATENT DOCUMENTS

| | | | | |
|---|---|---|---|---|
| 2019/0294889 | A1* | 9/2019 | Sriram | G06T 7/70 |
| 2020/0380357 | A1* | 12/2020 | Yao | G06N 3/08 |
| 2021/0201460 | A1* | 7/2021 | Gong | G06N 3/045 |
| 2024/0185582 | A1* | 6/2024 | Bozorgtabar | G06V 10/762 |

FOREIGN PATENT DOCUMENTS

CN 109522905 A * 3/2019 ........... G06F 30/398

OTHER PUBLICATIONS

Do & Batzoglou, "What is the expectation maximization algorithm?," Nature Biotechnology 26(8), 897-899.
(Continued)

*Primary Examiner* — Quan M Hua
(74) *Attorney, Agent, or Firm* — Dickinson Wright PLLC

(57) ABSTRACT

Disclosed herein include systems, devices, and methods for generating training data for spot detection using generative models with expectation maximization. The training data can be used to train a machine learning model for spot detection.

20 Claims, 9 Drawing Sheets

(56) References Cited

OTHER PUBLICATIONS

Laubscher et al., "Polaris: accurate spot detection for biological images with deep learning and weak supervision," WiML 2021 Virtual Workshop, Dec. 9, 2021, Poster, in 1 page.
Laubscher et al., "Polaris: accurate spot detection for biological images with deep learning and weak supervision," NeurIPS 2021, Presentation, Dec. 8, 2021, in 1 page. https://neurips.cc/virtual/2021/33461, Last Accessed Jun. 13, 2023.
Mabaso et al., "Spot Detection Methods in Fluorescence Microscopy Imaging: A Review," Image Anal Stereol 2018, 37, 173-190.
Ratner et al., "Snorkel: Rapid Training Data Creation with Weak Supervision," arXiv 2017, in 17 pages.
Smal et al., "Quantitative Comparison of Spot Detection Methods in Fluorescence Microscopy," IEEE Transactions on Medical Imaging 2010, in 30 pages.

\* cited by examiner

TRAINING DATA GENERATION WITH GENERATIVE MODELING

RELATED APPLICATIONS

This application claims the benefit under 35 U.S.C. § 119(e) of U.S. Provisional Patent Application Ser. No. 63/153,215, filed Feb. 24, 2021, the content of this related application is incorporated herein by reference in its entirety for all purposes.

BACKGROUND

Field

The present disclosure relates generally to the field of machine learning, in particular generating training data for machine learning.

Description of the Related Art

Imaging experiments are critical tools for observing the behaviors of objects in a wide range of different applications, such as biological, geological, and astronomical imaging. Often the objects of interest are small enough relative to the pixel size of the image that sub-pixel resolution is required to precisely describe the location of these spots. The abundance and location of these spots can be quantified and determined using machine learning models. Performance of machine learning models can depend on the training data used to train the machine learning models. There is a need for generating high quality training data that would improve the performance of machine learning models.

SUMMARY

Disclosed herein include methods for generating training data for spot detection. In some embodiments, a method for generating training data for spot detection is under control of processor (e.g., a hardware processor or a virtual processor). The method can comprise receiving a training image. The method can comprise for each of a plurality of spot detection methods (also referred to herein as spot detection algorithms, or annotators), detecting a plurality of spots on the training image using the spot detection method. The method can comprise clustering spots (e.g., all spots) of pluralities of spots to generate a plurality of clusters each comprising one or more spots of the pluralities of spots. The method can comprise iteratively determining a true positive rate (TPR) and a false positive rate (FPR) for each of the plurality of spot detection methods until the TPR of the spot detection method converge and the FPR of the spot detection method converge. Iteratively determining a TPR and a FPR can comprise, in each iteration: for each of the plurality of clusters, determining a probability of the cluster being a true positive (TP) and a probability of the cluster being a false positive (FP) using a TPR and a FPR of the spot detection method. The TPR and the FPR can be an initial true positive rate (TPR) and an initial false positive rate (FPR), respectively, or a TPR and a FPR determined from a prior iteration, respectively. Iteratively determining a TPR and a FPR can comprise determining (i) an expectation value of the cluster being a TP, (ii) an expectation value of the cluster being a false negative (FN), (iii) an expectation value of the cluster being a FP, and (iv) an expectation value of the cluster being a true negative (TN) using the probability of the cluster being a TP and the probability of the cluster being a FP and/or whether the cluster comprises a spot of the plurality of spots determined using the spot detection method. Iteratively determining a TPR and a FPR can comprise determining (i) an expectation value of a total number of TPs, (ii) an expectation value of a total number of FNs, (iii) an expectation value of a total number of FPs, and (iv) an expectation value of a total number of TNs using the expectation values of each of the plurality of clusters being a TP, a FN, a FP, and a TN. Iteratively determining a TPR and a FPR can comprise determining a TPR and a FPR for spot detection method for the iteration using the expectation values of the total numbers of TPs, FNs, FPs, and TNs. The method can comprise generating training data (also referred to herein as annotated training data) comprising the training image and a plurality of training clusters (also referred to herein as annotations and can include, for example ground truth coordinate annotations) comprising clusters (e.g., some or all clusters) of the plurality of clusters.

In some embodiments, a method for generating training data for spot detection is under control of a processor (e.g., a hardware processor or a virtual processor). The method can comprise receiving a training image. The method can comprise for each of a plurality of spot detection methods (also referred to herein as spot detection algorithms, or annotators), detecting a plurality of spots on the training image using the spot detection method. The method can comprise clustering spots (e.g., all spots) of pluralities of spots to generate a plurality of clusters each comprising one or more spots of the pluralities of spots. The method can comprise performing generative modeling with expectation maximization on the plurality of clusters to determine a true positive rate (TPR) and a false positive rate (FPR) for each of the plurality of spot detection methods. The method can comprise generating training data (also referred to herein as annotated training data) comprising the training image and a plurality of training clusters (also referred to herein as annotations and can include, for example ground truth coordinate annotations) comprising clusters (e.g., all clusters) of the plurality of clusters.

In some embodiments, a method for generating training data for spot detection is under control of a processor (e.g., a hardware processor or a virtual processor). The method can comprise receiving a plurality of training images. The method can comprise, for each training image: for each of a plurality of spot detection methods (also referred to herein as spot detection algorithms, or annotators), detecting a plurality of spots on the training image using the spot detection method. The method can comprise clustering spots (e.g., all spots) of pluralities of spots to generate a plurality of clusters each comprising one or more spots of the pluralities of spots. The method can comprise performing generative modeling with expectation maximization to determine a true positive rate (TPR) and a false positive rate (FPR) for each of the plurality of spot detection methods. The method can comprise generating training data (also referred to herein as annotated training data) comprising the plurality of training images and a plurality of training clusters (also referred to herein as annotations and can include, for example ground truth coordinate annotations) comprising clusters (e.g., all clusters) of the plurality of clusters for each of the plurality of images.

In some embodiments, performing generative modeling with expectation maximization comprises iteratively determining a TPR and a FPR for each of the plurality of spot detection methods until the TPR of the spot detection method converge and the FPR of the spot detection method converge. Iteratively determining the TPR and a FPR for each of the plurality of spot detection methods can comprise: for each of the plurality of clusters, determining (i) an expectation value of a total number of true positives (TPs), (ii) an expectation value of a total number of false negatives (FNs), (iii) an expectation value of a total number of false positives (FPs), and (iv) an expectation value of a total number of true negatives (TNs) based on a probability of the cluster being a TP and a probability of the cluster being a FP. Iteratively determining the TPR and a FPR for each of the plurality of spot detection methods can comprise: determining a TPR and a FPR for the spot detection method for the iteration using the expectation values of the total numbers of TPs, FNs, FPs, and TNs. Iteratively determining the TPR and a FPR for each of the plurality of spot detection methods can comprise: for each of the plurality of clusters, determining (i) an expectation value of the cluster being a TP, (ii) an expectation value of the cluster being a FN, (iii) an expectation value of the cluster being a FP, and (iv) an expectation value of the cluster being a TN based on a probability of the cluster being a TP and a probability of the cluster being a FP and/or whether the cluster comprises a spot of the plurality of spots determined using the spot detection method. Iteratively determining the TPR and a FPR for each of the plurality of spot detection methods can comprise: determining the probability of the cluster being a TP and the probability of the cluster being a FP. Determining the expectation values of each of the plurality of clusters being a TP, a FN, a FP, and a TN can comprise: determining the expectation values of each of the plurality of clusters being a TP, a FN, a FP, and a TN using the probability of the cluster being a TP and the probability of the cluster being a FP and/or whether the cluster comprises a spot of the plurality of spots determined using the spot detection method.

In some embodiments, performing generative modeling with expectation maximization comprises, (a) for each of the plurality of spot detection methods: for each of the plurality of clusters: (a1) determining a probability of the cluster being a true positive (TP) and a probability of the cluster being a false positive (FP) using a TPR and a FPR of the spot detection method. The TPR and the FPR can be an initial true positive rate (TPR) and an initial false positive rate (FPR), respectively, or a TPR and a FPR determined from a prior iteration, respectively. Performing generative modeling with expectation maximization can comprise: (a2) determining (i) an expectation value of the cluster being a TP, (ii) an expectation value of the cluster being a false negative (FN), (iii) an expectation value of the cluster being a FP, and (iv) an expectation value of the cluster being a true negative (TN) using the probability of the cluster being a TP and the probability of the cluster being a FP and/or whether the cluster comprises a spot of the plurality of spots determined using the spot detection method. Performing generative modeling with expectation maximization can comprise: (a3) determining (i) an expectation value of a total number of TPs, (ii) an expectation value of a total number of FNs, (iii) an expectation value of a total number of FPs, and (iv) an expectation value of a total number of TNs using the expectation values of each of the plurality of clusters being a TP, a FN, a FP, and a TN. Performing generative modeling with expectation maximization can comprise: (a4) determining a TPR and a FPR for the spot detection method for the iteration using the expectation values of the total numbers of TPs, FNs, FPs, and TNs. Performing generative modeling with expectation maximization can comprise: (b) repeating step (a) until the TPR of the spot detection method converge and the FPR of the spot detection method converge.

In some embodiments, the TPR of the spot detection method converge and the FPR of the spot detection method converge when the TPR of the current iteration and the TPR of the prior iteration differ by less than a threshold (e.g., 0.02, 0.015, 0.01, 0.005, 0.001, 0.0005, or 0.0001) and/or when the FPR of the current iteration and the FPR of the prior iteration differ by less than the threshold. In some embodiments, if the cluster comprises a spot of the plurality of spots detected using the spot detection method, the expectation values of the cluster are (i) a TP, (ii) a FN, (iii) a FP, and (iv) a TN are (i) the probability of the cluster being a TP, (ii) 0, (iii) the probability of the cluster being a FP, (iv) 0, respectively. If the cluster does not comprise a spot of the plurality of spots detected using the spot detection method, the expectation values of the cluster can be (i) a TP, (ii) a FN, (iii) a FP, and (iv) a TN are (i) 0, (ii) the probability of the cluster being a TP, (iii) 0, and (iv) the probability of the cluster being a FP, respectively.

In some embodiments, the training image comprises a fluorescent image. Receiving the training image can comprise labeling a sample (e.g., a clinical sample, a soil sample, an air sample, an environmental sample, a cell culture sample, a bone marrow sample, a rainfall sample, a fallout sample, a sewage sample, a ground water sample, an abrasion sample, an archaeological sample, a food sample, a blood sample, a serum sample, a plasma sample, a urine sample, a stool sample, a semen sample, a lymphatic fluid sample, a cerebrospinal fluid sample, a nasopharyngeal wash sample, a sputum sample, a mouth swab sample, a throat swab sample, a nasal swab sample, a bronchoalveolar lavage sample, a bronchial secretion sample, a milk sample, an amniotic fluid sample, a biopsy sample, a cancer sample, a tumor sample, a tissue sample, a cell sample, a cell culture sample, a cell lysate sample, a virus culture sample, a nail sample, a hair sample, a skin sample, a forensic sample, an infection sample, a nosocomial infection sample, a production sample, a drug preparation sample, a biological molecule production sample, a protein preparation sample, a lipid preparation sample, a carbohydrate preparation sample, a space sample, or an extraterrestrial sample). Receiving the training image can comprise generating the training image from the sample.

In some embodiments, the method further comprises generating and displaying a graphical user interface (GUI) comprising (i) the training image overlaid with graphical representations of the plurality of spots, and (ii) one or more parameters of the spot detection method used to detect the plurality of spots. The method can comprise receiving one or more updated parameters. The method can comprise performing spot detection on the training image using the spot detection method and the one or more updated parameters to generate a plurality of updated spots. The method can comprise generating and displaying a GUI comprising (i) the training image overlaid with graphical representations of the plurality of updated spots, and (ii) the one or more updated parameters.

In some embodiments, the plurality of spot detection methods comprises 3 spot detection methods. The plurality of spot detection methods can comprise peak local maximum, Laplacian of Gaussian, difference of Gaussian, Determinant of Hessian, h-dome detection, and/or Crocker-Grier centroid finding.

In some embodiments, clustering the spots comprises clustering the spots of pluralities of spots to generate the plurality of clusters each comprising one or more spots of the pluralities of spots based on locations of the spots. The spot in a cluster can be closer to any other spots in the cluster than spots in other clusters. Each of the plurality clusters can comprise at most one spot from each of the pluralities of spots.

In some embodiments, the method further comprises receiving the initial TPR and the initial FPR for one, one or more, or each of the plurality of spot detection methods. The method can further comprise determining the initial TPR and the initial FPR for one, one or more, or each of the plurality of spot detection methods. Determining the initial TPR and the initial FPR for one, one or more, or each of the plurality of spot detection methods can comprise: performing spot detection on each of a plurality of simulated images using the spot detection method to generate a plurality of simulated spots. The plurality of simulated images can be each associated with a plurality of ground truth spots. Determining the initial TPR and the initial FPR for one, one or more, or each of the plurality of spot detection methods can comprise: determining the initial TPR and the initial FPR using the plurality of simulated spots and the plurality of ground truth spots.

In some embodiments, training clusters of the plurality of training clusters have sub-pixel precision. In some embodiments, the method further comprises generating the plurality of training clusters comprising clusters of the plurality of clusters for the training image. Generating the plurality of training clusters can comprise: determining for each of the plurality of clusters an associated probability of the cluster being a TP. Generating the plurality of training clusters can comprise: generating the plurality of training clusters comprising clusters of the plurality of clusters each with a probability of the training cluster being a TP at or above a threshold (e.g., 0.8, 0.85, 0.9, 0.95, 0.97, or 0.99), Generating the plurality of training clusters can comprise: disregarding clusters of the plurality of clusters each with a probability of being a TP below the threshold. In some embodiments, the plurality of training clusters comprises all clusters of the plurality of clusters. Generating the plurality of training clusters can comprise determining for each of the plurality of training clusters an associated probability of the training cluster being a TP. In some embodiments, the method further comprises determining centers of each of the plurality of training clusters based on the one or more spots in the training cluster and/or a probability of each of the one or more spots in the training cluster being a TP.

In some embodiments, the method further comprises training a machine learning model (e.g., a deep learning model, or a weakly supervised deep learning model) using the training data. The machine learning model can output a plurality of spots with sub-pixel precision. The machine learning model can output a pixel-wise classification prediction of each pixel in an input image containing a spot and a regression prediction of a distance of each pixel in the input image from the nearest spot in the image. In some embodiments, the method further comprises receiving an input image. The method can further comprise performing spot detection on the input image using the machine learning model. The input image can comprise a fluorescent image. Receiving the input image can comprise labeling a sample. Receiving the input image can comprise generating the input image from the sample. In some embodiments, the training image and the input image are generated using two different spot labeling methods. The spot labeling methods can comprise two of MERFISH, SeqFISH, SplitFISH, In Situ Sequencing, and SunTag labeling.

Disclosed herein include systems for spot detection. In some embodiments, a system for spot detection comprises non-transitory memory configured to store executable instructions, and a machine learning model. The machine learning model is trained using training data comprising a plurality of training images and a plurality of training clusters on each of the plurality of training images. The plurality of training clusters can be generated based on (a) a plurality of clusters each comprising one or more spots of pluralities of spots on a training image. Each plurality of spots can be detected on the training image using one of a plurality of spot detection methods. The plurality of training clusters can be generated based on (b) generative modeling with expectation maximization on the plurality of clusters which determines a true positive rate (TPR) and a false positive rate (FPR) for each of the plurality of spot detection methods for the training image. The system can comprise a hardware processor in communication with the non-transitory memory. The hardware processor can be programmed by the executable instructions to receive an input image. The hardware processor can be programmed by the executable instructions to perform spot detection on the input image using the machine learning model.

In some embodiments, the hardware processor is programmed by the executable instructions to generate the training data. The hardware processor can be programmed by the executable instructions to train the machine learning model using the training. The machine learning model can comprise a deep learning model. In some embodiments, the hardware processor is programmed by the executable instructions to generate and display a graphical user interface (GUI) comprising the input image overlaid with graphical representations of one or more output of the machine learning model.

In some embodiments, outputs of the machine learning model comprise a plurality of spots with sub-pixel precision and/or a center of one, one or more, or each of the plurality of spots. In some embodiments, outputs of the machine learning model comprise a pixel-wise classification prediction of each pixel in an input image containing a spot. Outputs of the machine learning model can comprise a regression prediction of a distance of each pixel in the input image from the nearest spot in the image.

In some embodiments, a training image of the plurality of training images comprises a fluorescent image, and/or wherein the input image comprises a fluorescent image. In some embodiments, the training image and the input image are generated using two different spot labeling methods, such as MERFISH, SeqFISH, SplitFISH, In Situ Sequencing, and SunTag labeling.

In some embodiments, generative modeling with expectation maximization comprises iteratively determining a TPR and a FPR for each of the plurality of spot detection methods until the TPR of the spot detection method converge and the FPR of the spot detection method converge. Iteratively determining the TPR and a FPR for each of the plurality of spot detection methods can comprise: for each of the plurality of clusters, determining (i) an expectation value of a total number of true positives (TPs), (ii) an expectation value of a total number of false negatives (FNs), (iii) an expectation value of a total number of false positives (FPs), and (iv) an expectation value of a total number of true negatives (TNs) based on a probability of the cluster being a TP and a probability of the cluster being a FP. Iteratively determining the TPR and a FPR for each of the plurality of spot detection methods can comprise: determining a TPR and a FPR for the spot detection method for the iteration using the expectation values of the total numbers of TPs, FNs, FPs, and TNs. Iteratively determining the TPR and a FPR for each of the plurality of spot detection methods can comprise: for each of the plurality of clusters, determining (i) an expectation value of the cluster being a TP, (ii) an expectation value of the cluster being a FN, (iii) an expectation value of the cluster being a FP, and (iv) an expectation value of the cluster being a TN based on a probability of the cluster being a TP and a probability of the cluster being a FP and whether the cluster comprises a spot of the plurality of spots determined using the spot detection method. Iteratively determining the TPR and a FPR for each of the plurality of spot detection methods can comprise: determining the probability of the cluster being a TP and the probability of the cluster being a FP, wherein determining the expectation values of each of the plurality of clusters being a TP, a FN, a FP, and a TN comprises: determining the expectation values of each of the plurality of clusters being a TP, a FN, a FP, and a TN using the probability of the cluster being a TP and the probability of the cluster being a FP and/or whether the cluster comprises a spot of the plurality of spots determined using the spot detection method.

In some embodiments, generative modeling with expectation maximization comprises, (a) for each of the plurality of spot detection methods: for each of the plurality of clusters: (a1) determining a probability of the cluster being a true positive (TP) and a probability of the cluster being a false positive (FP) using a TPR and a FPR of the spot detection method, wherein the TPR and the FPR are an initial true positive rate (TPR) and an initial false positive rate (FPR), respectively, or a TPR and a FPR determined from a prior iteration, respectively. Generative modeling with expectation maximization can comprise: (a2) determining (i) an expectation value of the cluster being a TP, (ii) an expectation value of the cluster being a false negative (FN), (iii) an expectation value of the cluster being a FP, and (iv) an expectation value of the cluster being a true negative (TN) using the probability of the cluster being a TP and the probability of the cluster being a FP and whether the cluster comprises a spot of the plurality of spots determined using the spot detection method. Generative modeling with expectation maximization can comprise: (a3) determining (i) an expectation value of a total number of TPs, (ii) an expectation value of a total number of FNs, (iii) an expectation value of a total number of FPs, and (iv) an expectation value of a total number of TNs using the expectation values of each of the plurality of clusters being a TP, a FN, a FP, and a TN. Generative modeling with expectation maximization can comprise: (a4) determining a TPR and a FPR for the spot detection method for the iteration using the expectation values of the total numbers of TPs, FNs, FPs, and TNs. Generative modeling with expectation maximization can comprise: (b) repeating step (a) until the TPR of the spot detection method converge and the FPR of the spot detection method converge.

In some embodiments, the TPR of the spot detection method converge and the FPR of the spot detection method converge when the TPR of the current iteration and the TPR of the prior iteration differ by less than a threshold (e.g., 0.02, 0.015, 0.01, 0.005, 0.001, 0.0005, or 0.0001) and/or when the FPR of the current iteration and the FPR of the prior iteration differ by less than the threshold.

In some embodiments, if the cluster comprises a spot of the plurality of spots detected using the spot detection method, the expectation values of the cluster being (i) a TP, (ii) a FN, (iii) a FP, and (iv) a TN are (i) the probability of the cluster being a TP, (ii) 0, (iii) the probability of the cluster are a FP, (iv) 0, respectively. If the cluster does not comprise a spot of the plurality of spots detected using the spot detection method, the expectation values of the cluster can be (i) a TP, (ii) a FN, (iii) a FP, and (iv) a TN are (i) 0, (ii) the probability of the cluster being a TP, (iii) 0, and (iv) the probability of the cluster being a FP, respectively.

In some embodiments, the plurality of spot detection methods comprises 3 spot detection methods. The plurality of spot detection methods can comprise peak local maximum, Laplacian of Gaussian, difference of Gaussian, Determinant of Hessian, h-dome detection, and/or Crocker-Grier centroid finding.

In some embodiments, the plurality of clusters is generated by clustering the spots of pluralities of spots to generate the plurality of clusters each comprising one or more spots of the pluralities of spots based on locations of the spots. Each of the plurality clusters can comprise at most one spot from each of the pluralities of spots.

In some embodiments, the initial TPR and the initial FPR for one, one or more, or each of the plurality of spot detection methods are received. In some embodiments, the initial TPR and the initial FPR for one, one or more, or each of the plurality of spot detection methods are determined. The initial TPR and the initial FPR for one, one or more, or each of the plurality of spot detection methods can by determined by: performing spot detection on each of a plurality of simulated images using the spot detection method to generate a plurality of simulated spots. The plurality of simulated images can be each associated with a plurality of ground truth spots. The initial TPR and the initial FPR for one, one or more, or each of the plurality of spot detection methods can by determined by: determining the initial TPR and the initial FPR using the plurality of simulated spots and the plurality of ground truth spots.

In some embodiments, training clusters of the plurality of training clusters have sub-pixel precision. In some embodiments, the plurality of training clusters comprises clusters of the plurality of clusters for the training image. The plurality of training clusters can be generated by: determining for each of the plurality of clusters an associated probability of the cluster being a TP. The plurality of training clusters can be generated by: generating the plurality of training clusters comprising clusters of the plurality of clusters each with a probability of the training cluster being a TP at or above a threshold (e.g., 0.8, 0.85, 0.9, 0.95, 0.97, or 0.99). The plurality of training clusters can be generated by: disregarding clusters of the plurality of clusters each with a probability of being a TP below the threshold. The plurality of training clusters can comprise all clusters of the plurality of clusters, and wherein generating the plurality of training clusters comprises: determining for each of the plurality of training clusters an associated probability of the training cluster being a TP.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1A:
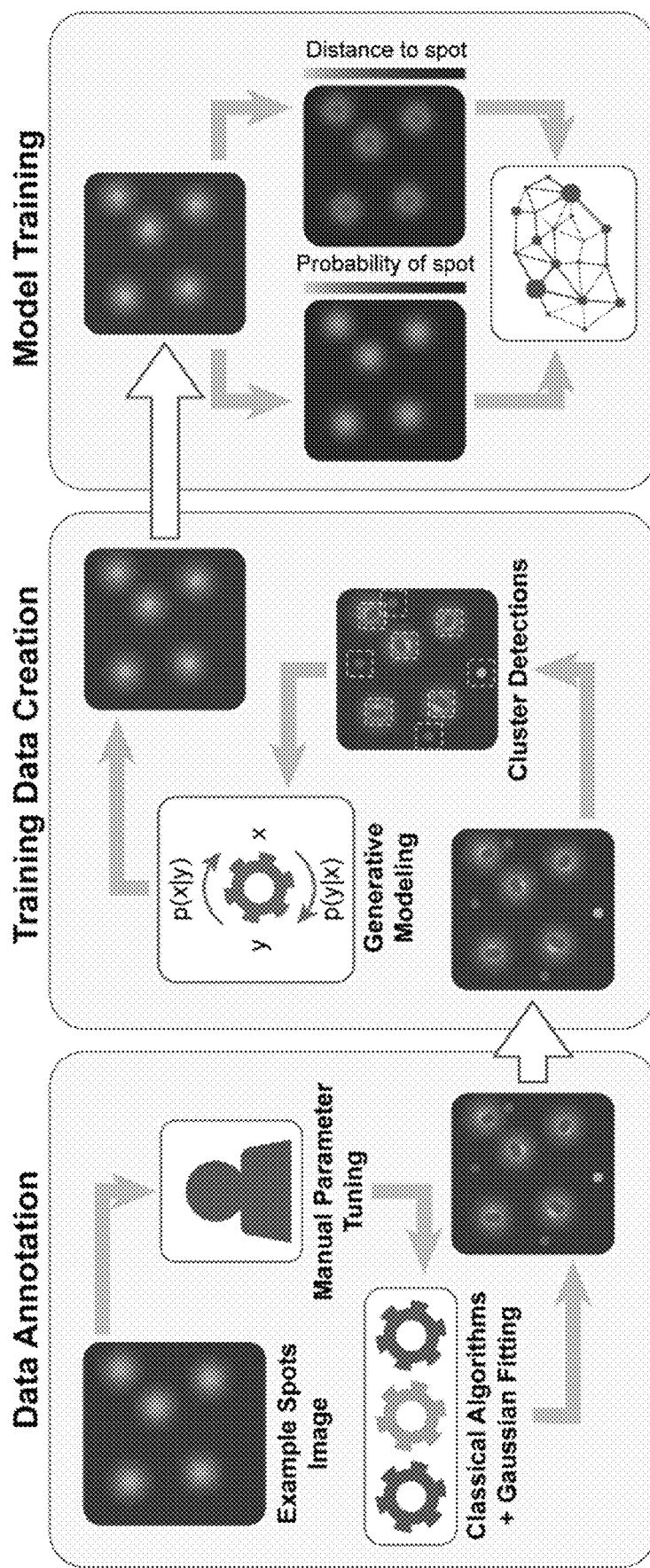
FIG. 1A-FIG. 1B depict exemplary schematic overviews of workflows for training data creation for the spot detection deep learning model with generative modeling.

Throughout the drawings, reference numbers may be re-used to indicate correspondence between referenced elements. The drawings are provided to illustrate example embodiments described herein and are not intended to limit the scope of the disclosure.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein and made part of the disclosure herein.

All patents, published patent applications, other publications, and databases referred to herein are incorporated by reference in their entirety with respect to the related technology.

Imaging experiments are critical tools for observing the behaviors of objects in a wide range of different applications, such as biological, geological, and astronomical imaging. Often the objects of interest, referred to herein as "spots", are small enough relative to the pixel size of the image that sub-pixel resolution is required to precisely describe the location of these spots. The ability to quantify the abundance and location of these spots contribute to the successful analysis of these images.

The naive approach to detecting spots in images is manual annotation of the location of spots in the images, which quickly becomes prohibitive because of the amount of expert time required to locate—with sub-pixel resolution—the thousands of spots in a typical data set. There are also several classical spot detection algorithms, which each have their shortcomings as they can struggle to detect spots that are either too close together or spots that have signal intensity that is too low compared to the image background intensity. Moreover, they require the user to adjust the parameters of the algorithms for each image, meaning they require a large amount of time and expertise to use.

There are a number of existing spot detection methods that fall into two main categories, classical and supervised, depending on whether they learn how to detect spots from example images. Classical methods use simple mathematical operators to detect spots, so their performance is brittle to changes in image characteristics. Therefore, these methods require time-consuming manually parameter tuning on a per-image basis or image pre-processing to optimize performance. Supervised methods can be less brittle but require careful training data assembly because the ground truth spot locations are inherently ambiguous. Because spots are small objects and typical images contain hundreds to thousands of spots, it is too prohibitively time-consuming to manually annotate spot locations and two experts may disagree on the number and location of spots in an image. Spot locations could be annotated with a classical algorithm, but, as provided above, each algorithm has flaws that would hinder the performance of the deep learning model. Therefore, methods for generating high-quality annotated training data would improve the performance of deep learning models for spot detection.

Deep learning models have been explored to solve these problems. However, it is prohibitively time-consuming to manually create annotated training data for these models, because it requires annotating the coordinate locations of thousands of spots per data set. Instead, these models are trained with simulated images, so the exact location of each of the simulated spots is known without annotation. Ideally, the spot detection models would be trained on experimental images, because simulated images cannot fully capture the nuances of experimental data, which hinders model performance. Therefore, methods for generating high quality annotated training data would improve the performance of spot detection deep learning models.

Disclosed herein include methods for generating training data for spot detection. In some embodiments, a method for generating training data for spot detection is under control of processor (e.g., a hardware processor or a virtual processor) and comprises receiving a training image. The method can comprise for each of a plurality of spot detection methods (also referred to herein as spot detection algorithms, or annotators), detecting a plurality of spots on the training image using the spot detection method. The method can comprise clustering spots (e.g., all spots) of pluralities of spots to generate a plurality of clusters each comprising one or more spots of the pluralities of spots. The method can comprise iteratively determining a true positive rate (TPR) and a false positive rate (FPR) for each of the plurality of spot detection methods until the TPR of the spot detection method converge and the FPR of the spot detection method converge. Iteratively determining a TPR and a FPR can comprise, in each iteration: for each of the plurality of clusters, determining a probability of the cluster being a true positive (TP) and a probability of the cluster being a false positive (FP) using a TPR and a FPR of the spot detection method. The TPR and the FPR can be an initial true positive rate (TPR) and an initial false positive rate (FPR), respectively, or a TPR and a FPR determined from a prior iteration, respectively. Iteratively determining a TPR and a FPR can comprise determining (i) an expectation value of the cluster being a TP, (ii) an expectation value of the cluster being a false negative (FN), (iii) an expectation value of the cluster being a FP, and (iv) an expectation value of the cluster being a true negative (TN) using the probability of the cluster being a TP and the probability of the cluster being a FP and/or whether the cluster comprises a spot of the plurality of spots determined using the spot detection method. Iteratively determining a TPR and a FPR can comprise determining (i) an expectation value of a total number of TPs, (ii) an expectation value of a total number of FNs, (iii) an expectation value of a total number of FPs, and (iv) an expectation value of a total number of TNs using the expectation values of each of the plurality of clusters being a TP, a FN, a FP, and a TN. Iteratively determining a TPR and a FPR can comprise determining a TPR and a FPR for spot detection method for the iteration using the expectation values of the total numbers of TPs, FNs, FPs, and TNs. The method can comprise generating training data (also referred to herein as annotated training data) comprising the training image and a plurality of training clusters (also referred to herein as annotations and can include, for example ground truth coordinate annotations) comprising clusters (e.g., some or all clusters) of the plurality of clusters.

In some embodiments, a method for generating training data for spot detection is under control of a processor (e.g., a hardware processor or a virtual processor) and comprises receiving a training image. The method can comprise for each of a plurality of spot detection methods (also referred to herein as spot detection algorithms, or annotators), detecting a plurality of spots on the training image using the spot detection method. The method can comprise clustering spots (e.g., all spots) of pluralities of spots to generate a plurality of clusters each comprising one or more spots of the pluralities of spots. The method can comprise performing generative modeling with expectation maximization on the plurality of clusters to determine a true positive rate (TPR) and a false positive rate (FPR) for each of the plurality of spot detection methods. The method can comprise generating training data (also referred to herein as annotated training data) comprising the training image and a plurality of training clusters (also referred to herein as annotations and can include, for example ground truth coordinate annotations) comprising clusters (e.g., all clusters) of the plurality of clusters.

In some embodiments, a method for generating training data for spot detection is under control of a processor (e.g., a hardware processor or a virtual processor) and comprises receiving a plurality of training images. The method can comprise, for each training image: for each of a plurality of spot detection methods (also referred to herein as spot detection algorithms, or annotators), detecting a plurality of spots on the training image using the spot detection method. The method can comprise clustering spots (e.g., all spots) of pluralities of spots to generate a plurality of clusters each comprising one or more spots of the pluralities of spots. The method can comprise performing generative modeling with expectation maximization to determine a true positive rate (TPR) and a false positive rate (FPR) for each of the plurality of spot detection methods. The method can comprise generating training data (also referred to herein as annotated training data) comprising the plurality of training images and a plurality of training clusters (also referred to herein as annotations and can include, for example ground truth coordinate annotations) comprising clusters (e.g., all clusters) of the plurality of clusters for each of the plurality of images.

Disclosed herein include systems for spot detection. In some embodiments, a system for spot detection comprises non-transitory memory configured to store executable instructions, and a machine learning model. The machine learning model is trained using training data comprising a plurality of training images and a plurality of training clusters on each of the plurality of training images. The plurality of training clusters can be generated based on (a) a plurality of clusters each comprising one or more spots of pluralities of spots on a training image. Each plurality of spots can be detected on the training image using one of a plurality of spot detection methods. The plurality of training clusters can be generated based on (b) generative modeling with expectation maximization on the plurality of clusters which determines a true positive rate (TPR) and a false positive rate (FPR) for each of the plurality of spot detection methods for the training image. The system can comprise a hardware processor in communication with the non-transitory memory. The hardware processor can be programmed by the executable instructions to receive an input image. The hardware processor can be programmed by the executable instructions to perform spot detection on the input image using the machine learning model.

Generative Modeling

Disclosed herein are methods for creating ground truth coordinate annotations with weakly supervised generative modeling to enable deep learning-based spot localization with sub-pixel resolution. These methods include estimation of the consensus between annotation sets from various classical spot detection algorithms with generative modeling and spot detection with a deep learning framework trained on the output of the generative model.

The disclosed methods address challenges in creating coordinate training data for deep learning models that perform image-based spot detection. In some embodiments, the method is a generative modeling method to find the consensus between the coordinate annotation sets created with various classical spot detection algorithms as well as a deep learning framework that makes use of these annotation sets for spot detection.

The method can comprise two components: (1) a generative model that annotates the location of spots in images by finding the consensus between the annotation sets output by various classical spot detection algorithms, and (2) a deep learning model trained on the consensus annotations output by the generative model. In some embodiments, the generative modeling is performed on expert-curated annotations from classical spot detection algorithms, because the parameters of these algorithms can be tuned for each individual image. In some embodiments, training data only needs to be curated once for a particular deep learning model, which can be generalizable to all future images from comparable experimental sources.

An exemplary workflow for the creation of training data for the spot detection deep learning model with generative modeling is outlined in FIG. 1A. In some embodiments, the locations of fluorescent spots in a collection of images are annotated using a collection of classical spot detection algorithms. This workflow can employ a graphical user interface (GUI) to allow the user to manually tune the algorithm parameters for each image. In some embodiments, the detections from each of the annotation sets are grouped by proximity into clusters of detections assumed to be derived from the same true spot in the original image. Because each classical algorithm has different shortcomings, a unique set of false positive and false negative detection are expected for each algorithm. The information about which spots are detected by which algorithm can be used to estimate the probability that each cluster is a true detection based on which classical algorithms detected each of the clusters. The clusters that exceed a threshold probability can be included in a training data set for a deep learning model for spot detection.

Figure 1B:
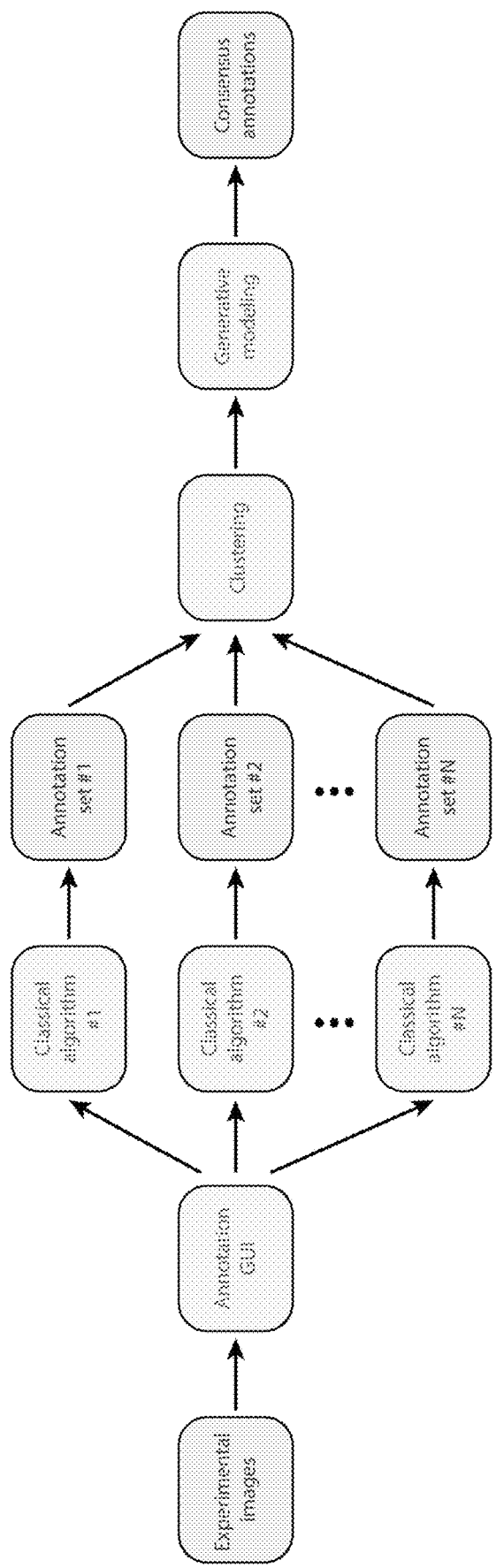

An exemplary workflow for creation of training data for the spot detection deep learning model with generative modeling is outlined in FIG. 1B. The black text in the figure represents data objects, including images and coordinate annotations, and the gray text represents the algorithms and tools used in the workflow. In some embodiments, the goal of the workflow is to produce a set of coordinate annotations that define the location of all spots in each input image. The coordinate locations of spots in input experimental images, as opposed to simulated images, can be defined with various classical spot detection algorithms. In some embodiments, this workflow employs a graphical user interface (GUI) to allow the user to dynamically update the algorithm parameters for each image and view the output coordinate locations of the spots plotted on the original image. The detections from each of the annotation sets can be grouped into clusters of detections assumed to be derived from the same true spot in the original image. Because each classical algorithm has unique flaws, it is expected that each set will have false positive detections, spots detected by the algorithm that do not correspond with a true spot in the original image, and false negatives, true spots missed by the algorithm. Therefore, in some embodiments, each cluster will not be comprised of the same number of detections. This information can be used to fit a generative model, which estimates the probability that each cluster is a true detection based on which classical algorithms detected each of the clusters.

Clustering Detections

The detections can be clustered into groups assumed to be derived from the same spot in the image. First, an adjacency matrix A can be defined with dimensions N×N where N is the total number of spots detected between all spot detection algorithms. If two detections i and j are sufficiently close, the values of A[i,j] and A[j,i] can be set to 1. All other values can be assigned to 0. This matrix can be used to define the edges of a NetworkX graph. The clusters of detections in this graph, as defined by the connected_components NetworkX function, are screened to ensure that they contained at most one detection from each algorithm. If they contained more than one, the detection closest to the centroid of the cluster was retained and all others were separated into new clusters.

Expectation Maximization

Figure 2A:
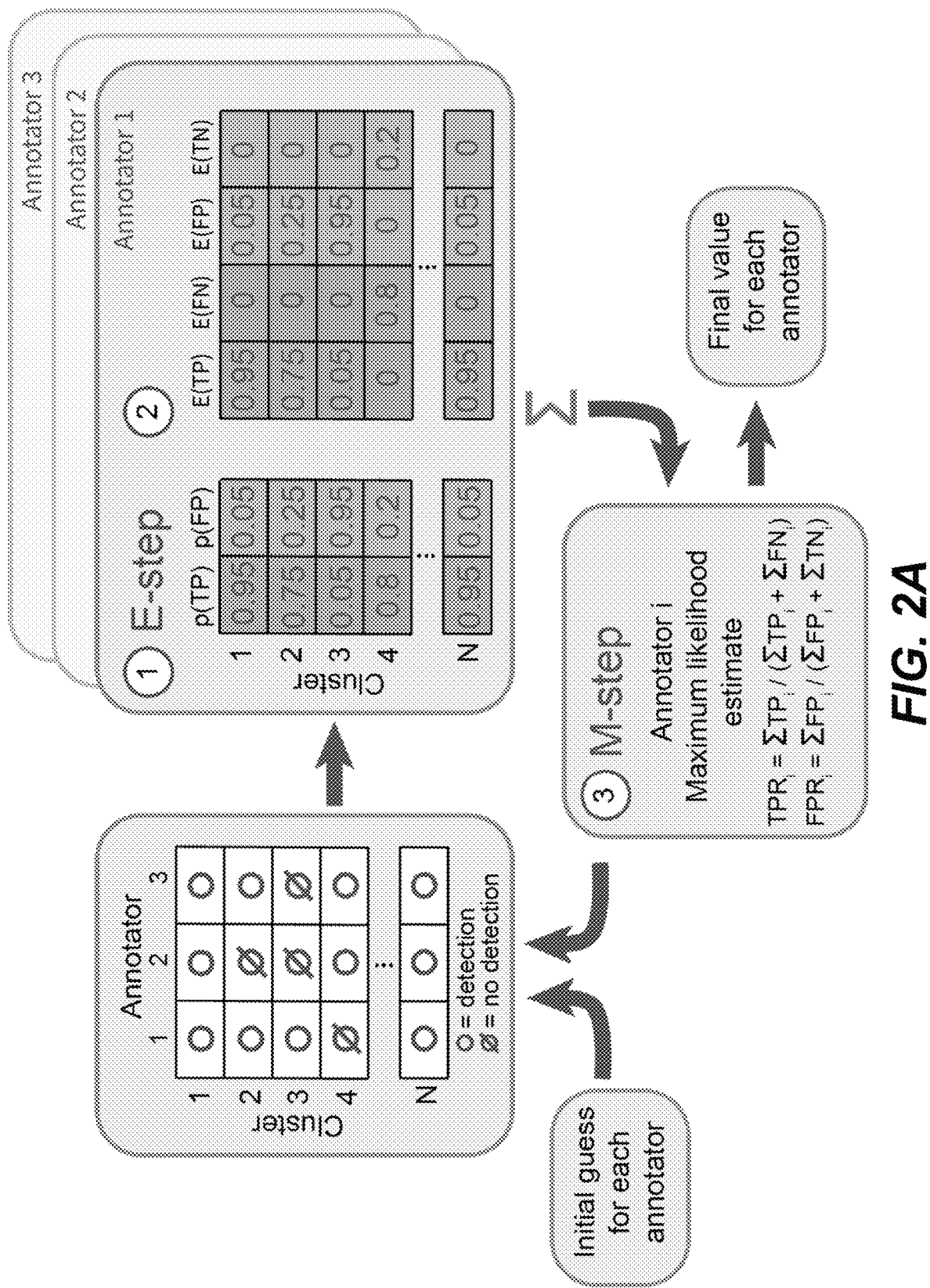
FIG. 2A-FIG. 2B are non-limiting schematics showing details of the generative modeling process to estimate the consensus between annotations from different classical spot detection algorithms.
Figure 2B:
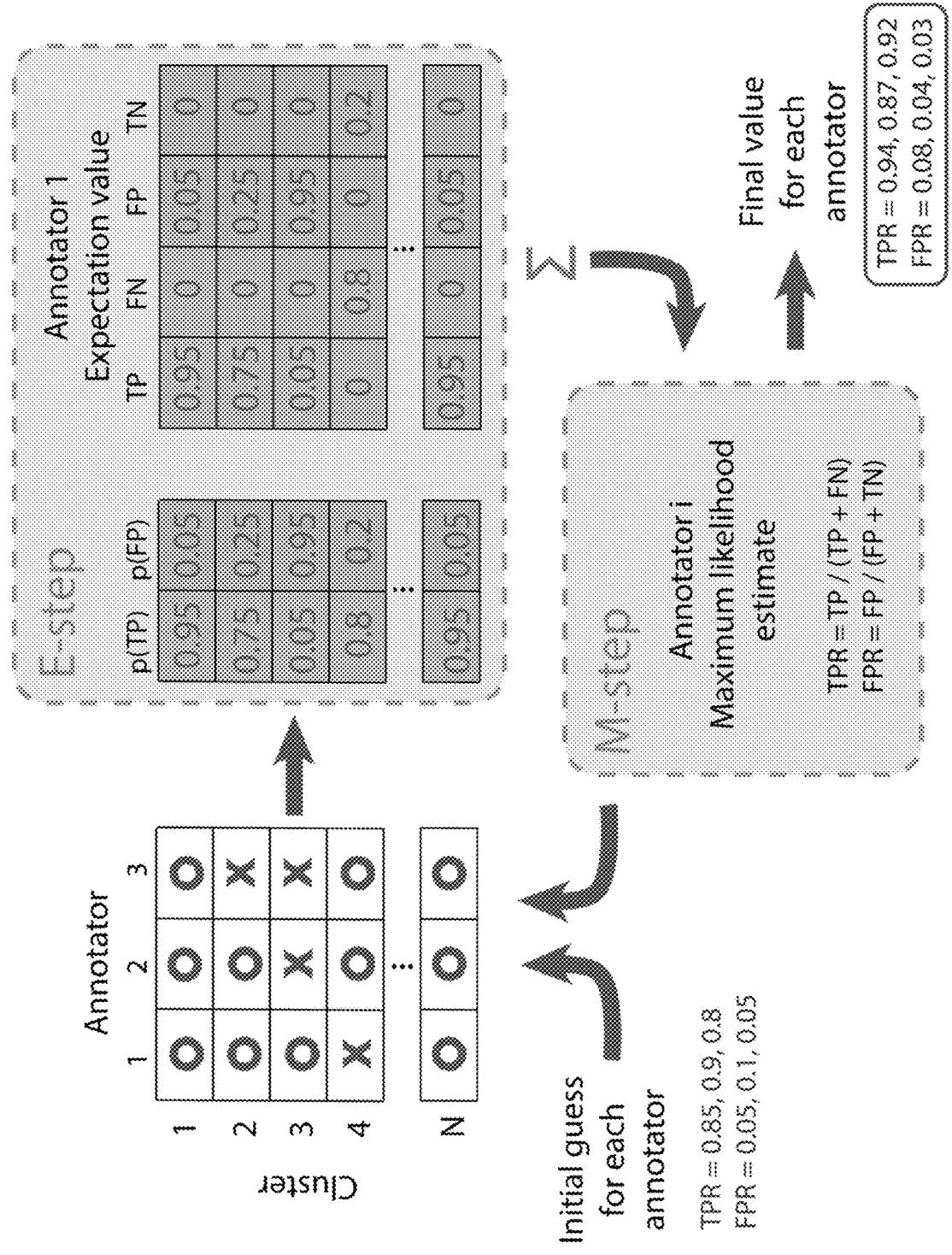

The details of the generative modeling algorithm, called expectation maximization (EM) in some embodiments, are demonstrated in FIG. 2A-FIG. 2B. This algorithm can comprise two steps that are repeated iteratively, the E-step, which estimates the probability that each cluster is a true detection or false detection, and M-step, which estimates the probability that each classical algorithm detects a true spot, or true positive rate (TPR), and the probability that each classical algorithm detects a false spot, or false positive rate (FPR). In some embodiments, the user provides information about which algorithms detected which clusters, and an initial guess for the TPR and FPR of each classical algorithm. This initial guess for the TPRs and FPRs can be estimated by testing the performance of each annotator on a set of simulated images. However, the EM algorithm is tolerant of relatively large errors in this initial guess for the TPR and FPR of each annotator, converging to the same value regardless of the input value. Using these initial guesses in the E-step, the Bayesian probability of each cluster being a true detection can be calculated. These probabilities can be used to calculate the expectation values for the total number of true positive, false negative, false positive, and true negative detections for each classical algorithm. In the M-step, the expectation values can be used to calculate an updated estimate for the TPR and FPR for each classical algorithm, which can be used in the next iteration in the place of the initial guesses for these values. After multiple iterations of these steps, the estimates for the TPRs and FPRs and the estimates for the probability that each cluster is a true detection can converge to their final output values.

Bayesian Probability of True Detection or False Detection

To calculate the probability that a cluster is a true detection, first, the method can include calculating the probability of observing the data, or which annotators (also referred to herein as spot detection methods or algorithms) were able to detect a particular spot. Identity of the spot as a true detection and the true positive rates of the n spot detection algorithms, $\theta=[TPR_1, TPR_2 \ldots TPR_n]$, can be given. The true positive rate (TPR) of an algorithm is the probability that it detects a ground truth true positive spot. Therefore, the probability that an annotator does not detect a true positive spot is 1−TPR. The identity of this spot as a true or false detection is denoted as Z. Therefore, the probability that all of the annotators detect a spot that is known to be a true detection is given by the following function:

$$p(\text{data} \mid Z, \theta) = \prod_{i=1}^{n} TPR_i$$

Therefore, for a theoretical set of three annotators, where the first two detect a spot and the last does not, the probability that the spot is a true detection is given by the following equation:

$$p(\text{data}|Z,\theta) = TPR_1 \cdot TPR_2 \cdot (1 - TPR_3)$$

The Bayesian probability of a detection being a true detection is given by the following equation:

$$p(Z \mid \text{data}, \theta) = \frac{p(\text{data} \mid Z, \theta) p(Z)}{p(\text{data} \mid \theta)}$$

In the expression for the Bayesian probability for p(Z|data, θ), the term p(data|θ) can be expressed at the marginal probability with the following form:

$$p(\text{data} \mid \theta) = \sum_{Z} p(\text{data} \mid Z, \theta) p(Z)$$

The term p(Z) is the prior probability of a spot being a true detection. The least informative value for the prior by setting p(Z)=1/2 can be used, for example, and means that there is an equal probability that a spot is a true detection or a false detection. With this assumption, the Bayesian probability for p(Z|data, θ) can be simplified:

$$p(Z \mid \text{data}, \theta) = \frac{p(\text{data} \mid Z, \theta) p(Z)}{p(\text{data})}$$

$$= \frac{p(\text{data} \mid Z, \theta) p(Z)}{\sum_{Z}(\text{data} \mid Z, \theta) p(Z)}$$

$$= \frac{p(\text{data} \mid Z, \theta) \cdot \frac{1}{2}}{\sum_{Z} p(\text{data} \mid Z, \theta) \cdot \frac{1}{2}}$$

$$= \frac{p(\text{data} \mid Z, \theta)}{\sum_{Z} p(\text{data} \mid Z, \theta)}$$

Therefore, the method can include normalizing the likelihood of each possible label, true detection or false detection, by the total likelihood of both labels to get the Bayesian probability that a cluster is a true detection or false detection.

Maximum Likelihood Estimate for the TPR and FPR of Each Annotator

The maximum likelihood estimate for the TPR and FPR of each annotator is calculated using the expectation value for the number of true positives, false negatives, false positives, and true negatives generated by each annotator. If an annotator detects a spot in a particular cluster, the expectation value for the number of true positives for that annotator in that cluster is equal for p(TP) for that cluster. and the number of false positives for that annotator in that cluster is equal for p(FP) for that cluster. The expectation value for the number of false negatives and true negatives is set to zero. If an annotator doesn't detect a spot in a particular cluster, the expectation value for the number of true negatives for that annotator in that cluster is equal for p(FP) for that cluster and the number of false negatives for that annotator in that cluster is equal for p(TP) for that cluster. The expectation value for the number of true positives and false positives is set to zero. The sum of these values across all clusters is taken as the expectation value for the total number of true positives, false negatives, false positives, and true negatives generated by each annotator.

These expectation values are used to calculate the maximum likelihood estimate for the $TPR_i$ and $FPR_i$ for annotator i with equations of the following form:

$$TPR_i = \frac{\sum TP_i}{\sum TP_i + \sum FN_i}$$

$$FPR_i = \frac{\sum FP_i}{\sum FP_i + \sum TN_i}$$

Generative Model Outputs

In some embodiments, the output of the generative model can be used in two different ways to create training data sets for a spot detection deep learning model: (1) thresholded cluster labels, where clusters with a predicted probability of being a true detection above some threshold value can be used in the training set and all others are rejected, or (2) soft probabilistic cluster labels, where the probabilities output by the generative model can be used to train the deep learning model. For both training methods, the deep learning model can output a pixel-wise classification prediction, which predicts the probability of each pixel containing a spot, and a regression prediction, which predicts the distance of each pixel from the nearest spot. In some embodiments, these outputs are used together to predict the position of each of the spots in the image with sub-pixel resolution.

Performance

Figure 3:
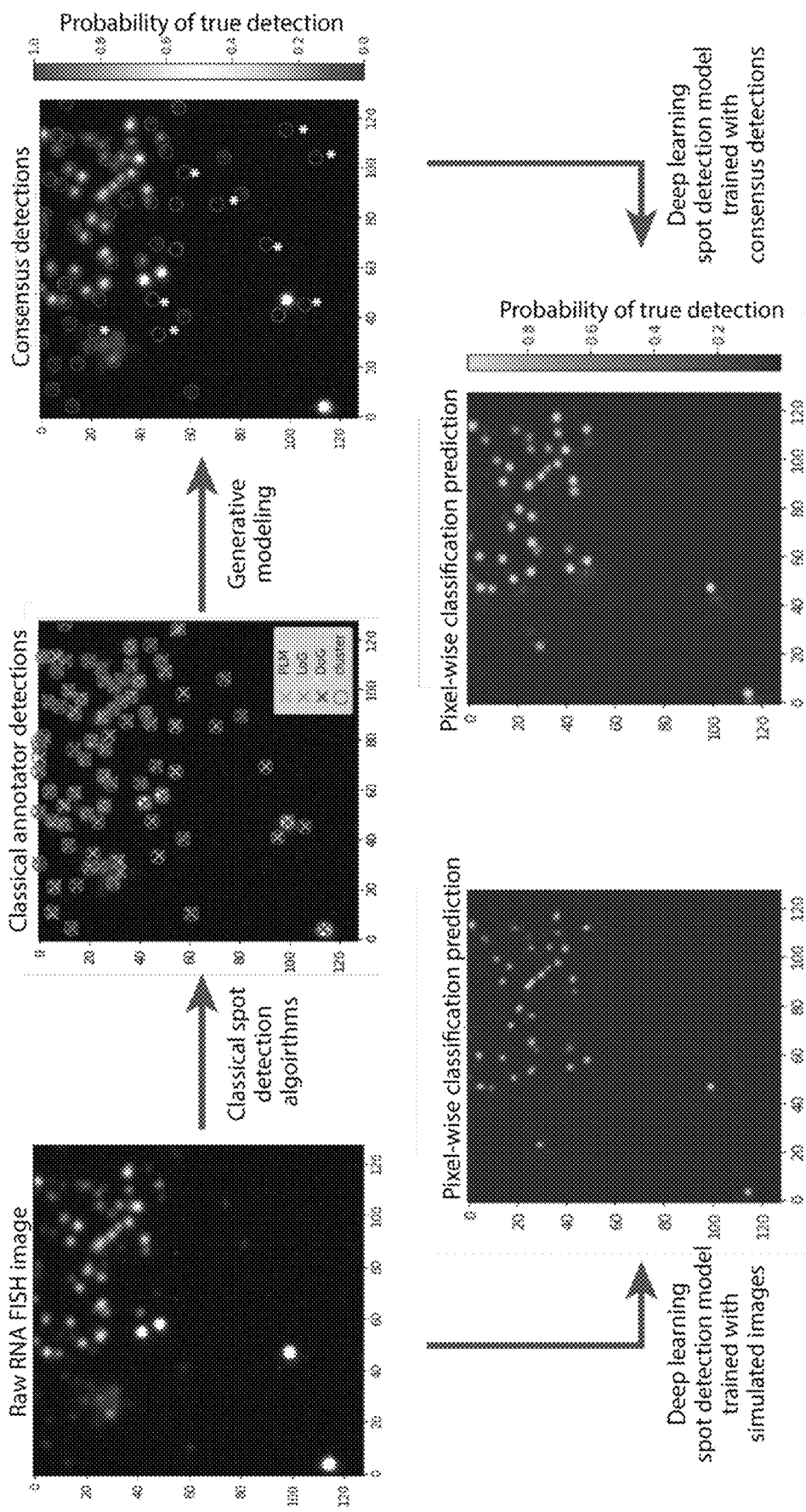
FIG. 3 depicts a non-limiting exemplary illustration of the generative modeling process with an example image.
Figure 3:
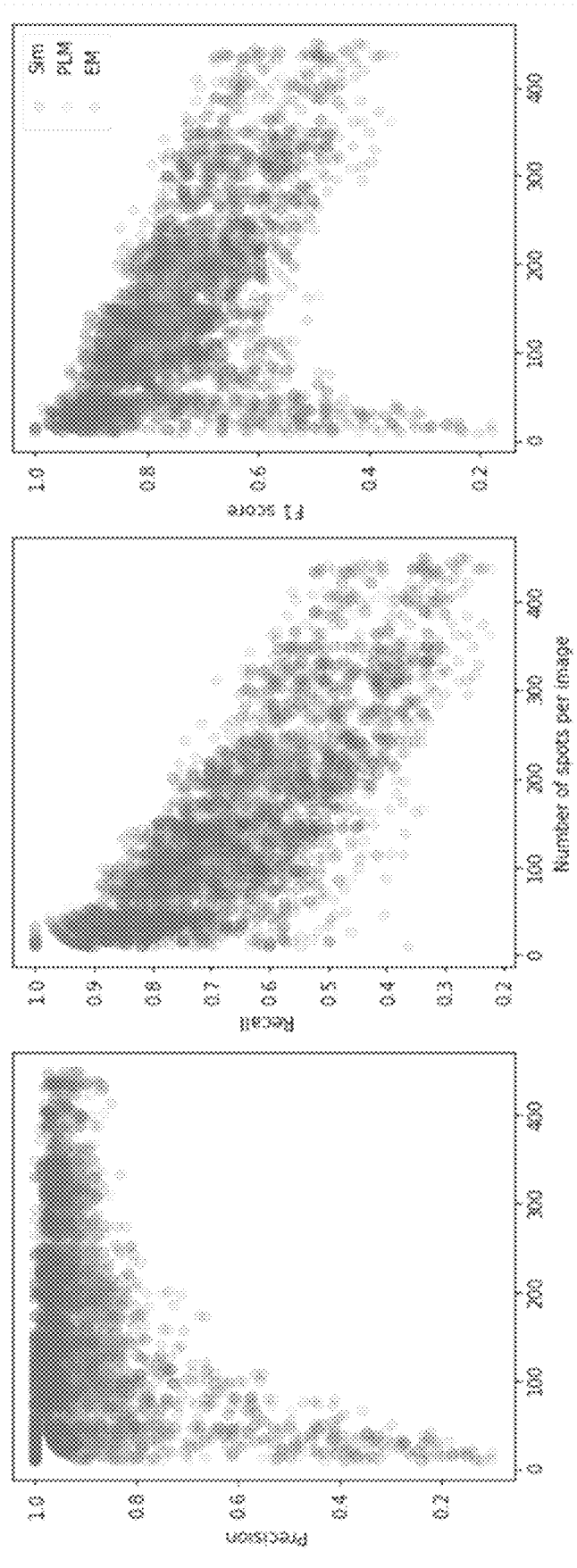

The power of the methods described herein is demonstrated on an example image in FIG. 3. The input image was produced in an RNA Fluorescence In Situ Hybridization (FISH) experiment, where individual RNA molecules were labeled with fluorescent DNA conjugates. The locations of the fluorescent spots were determined with three different classical spot detection algorithms well-suited for this particular data set: (1) peak local maximum, PLM, (2) Laplacian of Gaussian, LoG, and (3) difference of Gaussian, DoG. These annotation sets, demonstrated in the second image, differ slightly from each other, and these annotation sets are grouped into clusters of detections derived from the same spot in the original image, shown with circles. The probability that each cluster is a true detection was estimated with a generative model. Low probability spots are marked with a star below the spot. FIG. 3 demonstrates that a spot detection deep learning model trained with the consensus annotation set output by the generative model outperforms models trained with simulated images and models trained with annotation sets from any of the individual classical algorithms. The EM method disclosed herein has higher precision, higher recall, and higher F 1 scores compared to the PLM method and a machine learning model trained using simulated images. The method generalizes to other data types and annotation methods as shown in FIG. 4.

Figure 4:
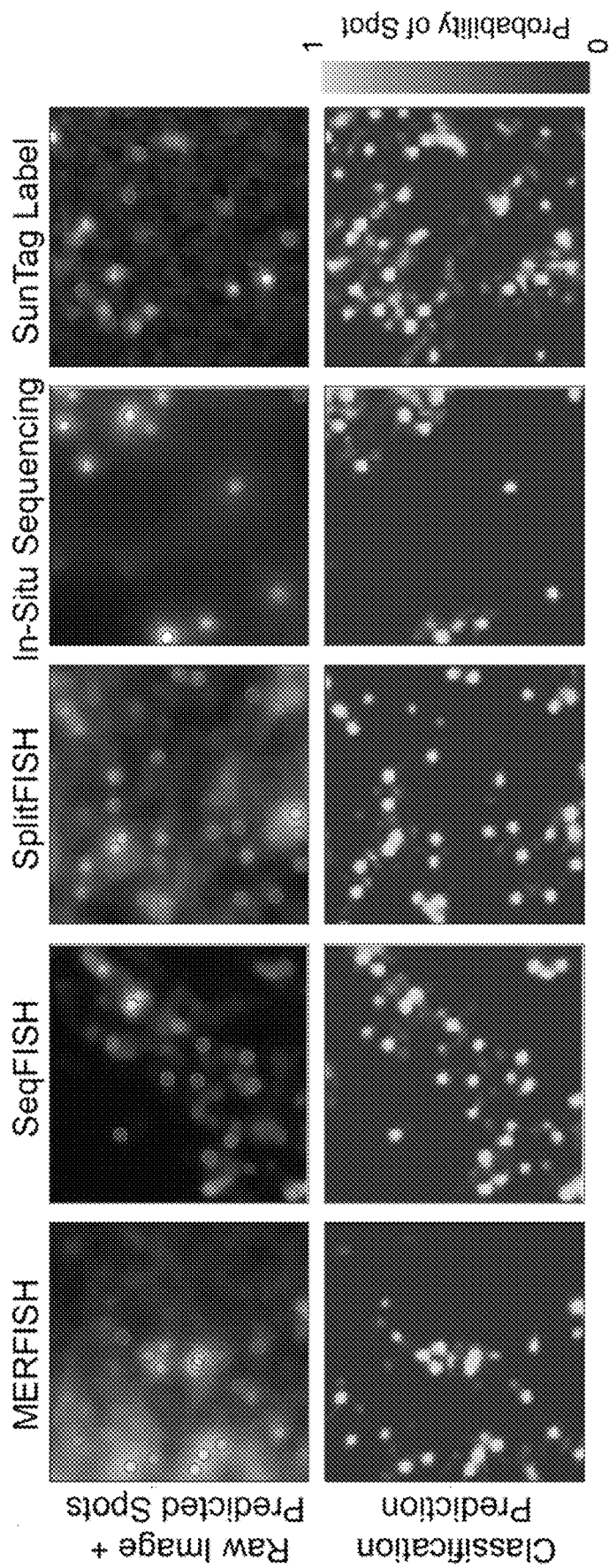
FIG. 4 depicts non-limiting exemplary data demonstrating the spot detection performance of the weakly supervised deep learning model on spot images from various assays.

The spot detection performance of one weakly supervised deep learning model on spot images from a wide range of assays (MERFISH, SeqFISH, SplitFISH, In Situ Sequencing, and SunTag labeling) is demonstrated in FIG. 4. A single model is general enough to predict the spot locations in images with varying spot and background characteristics.

Training Data Generation

Figure 5:
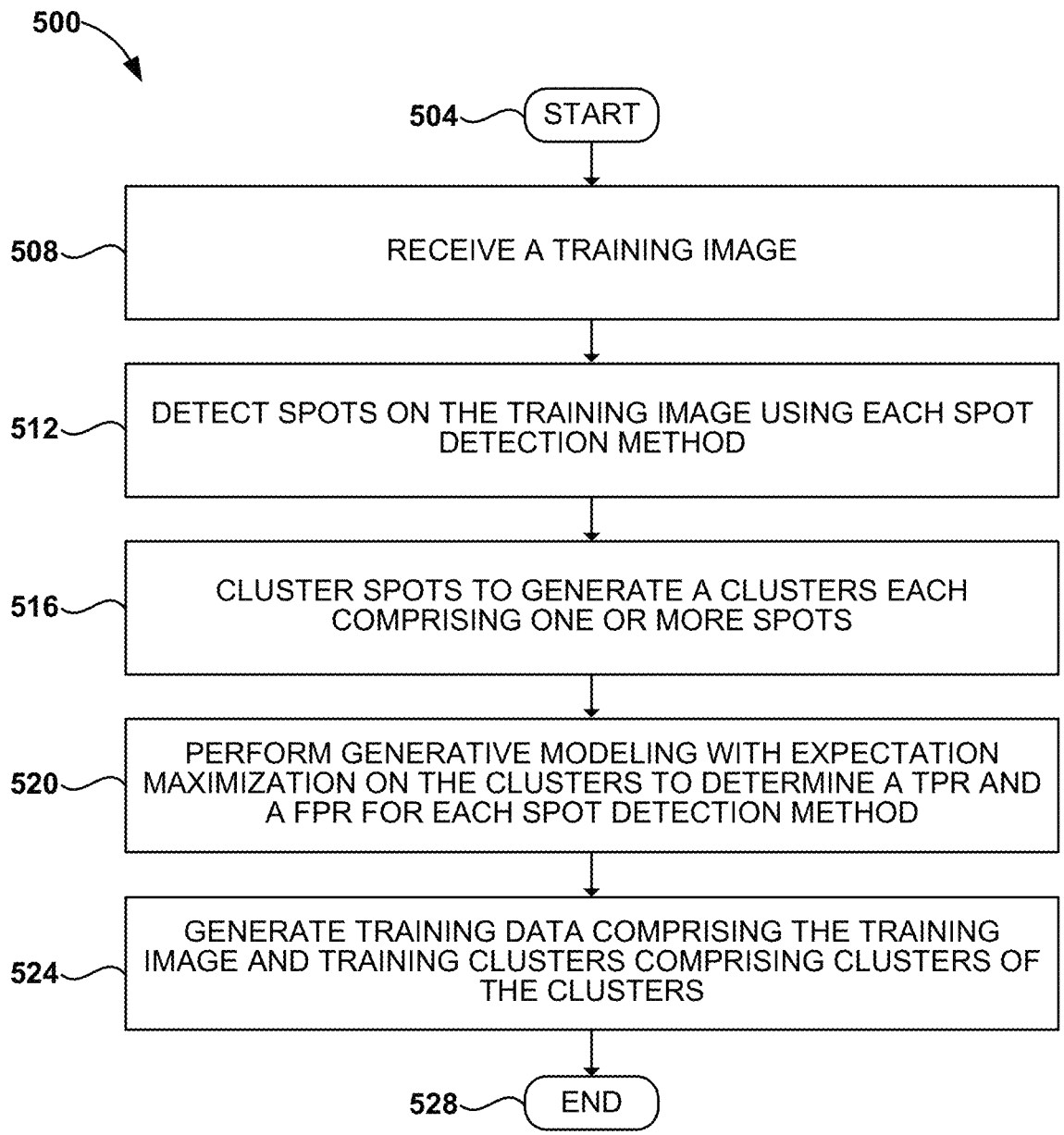
FIG. 5 is a flow diagram showing an exemplary method of training data generation.

FIG. 5 is a flow diagram showing an exemplary method 500 of training data generation. The method 500 may be embodied in a set of executable program instructions stored on a computer-readable medium, such as one or more disk drives, of a computing system. For example, the computing system 600 shown in FIG. 6 and described in greater detail below can execute a set of executable program instructions to implement the method 500. When the method 500 is initiated, the executable program instructions can be loaded into memory, such as RAM, and executed by one or more processors of the computing system 600. Although the method 500 is described with respect to the computing system 600 shown in FIG. 6, the description is illustrative only and is not intended to be limiting. In some embodiments, the method 500 or portions thereof may be performed serially or in parallel by multiple computing systems.

After the method 500 begins at block 504, the method 500 proceeds to block 508, where a computing system receives a plurality of training images. Each training image can comprise a fluorescent image. The training image can be generated after a sample is labeled. The sample can be, for example, a clinical sample, a soil sample, an air sample, an environmental sample, a cell culture sample, a bone marrow sample, a rainfall sample, a fallout sample, a sewage sample, a ground water sample, an abrasion sample, an archaeological sample, a food sample, a blood sample, a serum sample, a plasma sample, a urine sample, a stool sample, a semen sample, a lymphatic fluid sample, a cerebrospinal fluid sample, a nasopharyngeal wash sample, a sputum sample, a mouth swab sample, a throat swab sample, a nasal swab sample, a bronchoalveolar lavage sample, a bronchial secretion sample, a milk sample, an amniotic fluid sample, a biopsy sample, a cancer sample, a tumor sample, a tissue sample, a cell sample, a cell culture sample, a cell lysate sample, a virus culture sample, a nail sample, a hair sample, a skin sample, a forensic sample, an infection sample, a nosocomial infection sample, a production sample, a drug preparation sample, a biological molecule production sample, a protein preparation sample, a lipid preparation sample, a carbohydrate preparation sample, a space sample, or an extraterrestrial sample. The computing system can generate the training image from the sample.

The method 500 proceeds from block 508 to block 512, where the computing system, for each training image, detects a plurality of spots on the training image using each of a plurality of spot detection methods (also referred to herein as spot detection algorithms, classical spot detection algorithms, or annotators).

In some embodiments, the computing system can generate and/or display a graphical user interface (GUI) comprising (i) the training image overlaid with graphical representations of the plurality of spots, and (ii) one or more parameters of the spot detection method used to detect the plurality of spots. The GUI can include one or more GUI elements. A GUI element can be a window (e.g., a container window, browser window, text terminal, child window, or message window), a menu (e.g., a menu bar, context menu, or menu extra), an icon, or a tab. A GUI element can be for input control (e.g., a checkbox, radio button, dropdown list, list box, button, toggle, text field, or date field). A GUI element can be navigational (e.g., a breadcrumb, slider, search field, pagination, slider, tag, icon). A GUI element can informational (e.g., a tooltip, icon, progress bar, notification, message box, or modal window). A GUI element can be a container (e.g., an accordion).

The computing system can receive one or more updated parameters, for example, for a user. The computing system can perform spot detection on the training image using the spot detection method and the one or more updated parameters to generate a plurality of updated spots. The computing system can generate and/or display a GUI comprising (i) the training image overlaid with graphical representations of the plurality of updated spots, and (ii) the one or more updated parameters.

After block 512, the method 500 proceeds to block 516, where the computing system clusters spots (e.g., all spots) of pluralities of spots (which can include one or more pluralities of updated spots) to generate a plurality of clusters each comprising one or more spots of the pluralities of spots. To cluster the spots, the computing system can cluster the spots of pluralities of spots to generate the plurality of clusters each comprising one or more spots of the pluralities of spots based on locations of the spots. The spot in a cluster can be closer to any other spots in the cluster than spots in other clusters. Each of the plurality clusters can comprise at most one spot from each of the pluralities of spots. For example, if there are 10 spot detection methods, a cluster can include 1, 2, 3, 4, 5, 6, 7, 8, 9, or 10 spots, each detected by one of the spot detection methods. The computing system can perform clustering using a adjacency matrix. The computing system can perform clustering using connectivity-based clustering (hierarchical clustering), centroid-based clustering, distribution-based clustering, and/or density-based clustering.

The method 500 proceeds from block 516 to block 520, where the computing system performs generative modeling with expectation maximization on the plurality of clusters to determine a true positive rate (TPR) and a false positive rate (FPR) for each of the plurality of spot detection methods. In some embodiments, to perform generative modeling with expectation maximization, the computing system can iteratively determine a TPR and a FPR for each of the plurality of spot detection methods (e.g., 2, 3, 5, 10, 15, 20, or more) until the TPR of the spot detection method converge and the FPR of the spot detection method converge. The plurality of spot detection methods can comprise peak local maximum, Laplacian of Gaussian, difference of Gaussian, Determinant of Hessian, h-dome detection, and/or Crocker-Grier centroid finding.

The computing system can for each of the plurality of clusters, determine (i) an expectation value of a total number of true positives (TPs), (ii) an expectation value of a total number of false negatives (FNs), (iii) an expectation value of a total number of false positives (FPs), and (iv) an expectation value of a total number of true negatives (TNs) based on a probability of the cluster being a TP and a probability of the cluster being a FP. The computing system can determine a TPR and a FPR for the spot detection method for the iteration using the expectation values of the total numbers of TPs, FNs, FPs, and TNs. The computing system can for each of the plurality of clusters, determine (i) an expectation value of the cluster being a TP, (ii) an expectation value of the cluster being a FN, (iii) an expectation value of the cluster being a FP, and (iv) an expectation value of the cluster being a TN based on a probability of the cluster being a TP and a probability of the cluster being a FP and/or whether the cluster comprises a spot of the plurality of spots determined using the spot detection method. The computing system can determine the probability of the cluster being a TP and the probability of the cluster being a FP. To determine the expectation values of each of the plurality of clusters being a TP, a FN, a FP, and a TN, the computing system can determine the expectation values of each of the plurality of clusters being a TP, a FN, a FP, and a TN using the probability of the cluster being a TP and the probability of the cluster being a FP and/or whether the cluster comprises a spot of the plurality of spots determined using the spot detection method.

The TPR of the spot detection method converge and the FPR of the spot detection method converge when the TPR of the current iteration and the TPR of the prior iteration differ by less than a threshold (e.g., 0.02, 0.015, 0.01, 0.005, 0.001, 0.0005, or 0.0001) and/or when the FPR of the current iteration and the FPR of the prior iteration differ by less than the threshold. In some embodiments, if the cluster comprises a spot of the plurality of spots detected using the spot detection method, the expectation values of the cluster are (i) a TP, (ii) a FN, (iii) a FP, and (iv) a TN are (i) the probability of the cluster being a TP, (ii) 0, (iii) the probability of the cluster being a FP, (iv) 0, respectively. If the cluster does not comprise a spot of the plurality of spots detected using the spot detection method, the expectation values of the cluster can be (i) a TP, (ii) a FN, (iii) a FP, and (iv) a TN are (i) 0, (ii) the probability of the cluster being a TP, (iii) 0, and (iv) the probability of the cluster being a FP, respectively.

In some embodiments, the computing system can receive the initial TPR and the initial FPR for one, one or more, or each of the plurality of spot detection methods. The computing system can determine the initial TPR and the initial FPR for one, one or more, or each of the plurality of spot detection methods. To determine the initial TPR and the initial FPR for one, one or more, or each of the plurality of spot detection methods, the computing system can perform spot detection on each of a plurality of simulated images using the spot detection method to generate a plurality of simulated spots. The plurality of simulated images can be each associated with a plurality of ground truth spots. To determine the initial TPR and the initial FPR for one, one or more, or each of the plurality of spot detection methods, the computing system can determine the initial TPR and the initial FPR using the plurality of simulated spots and the plurality of ground truth spots.

After block 520, the method 500 proceeds to block 524, where the computing system generates training data (also referred to herein as annotated training data) comprising one or more of the plurality of training images. The training data can comprise, for each training image, a plurality of training clusters (also referred to herein as annotations and can include, for example ground truth coordinate annotations) comprising clusters (e.g., all clusters) of the plurality of clusters. Training clusters of the plurality of training clusters can have sub-pixel precision.

The computing system can generate the plurality of training clusters comprising clusters of the plurality of clusters for the training image. To generate the plurality of training clusters, the computing system can determine for each of the plurality of clusters an associated probability of the cluster being a TP. The computing system can generate the plurality of training clusters comprising clusters of the plurality of clusters each with a probability of the training cluster being a TP at or above a threshold (e.g., 0.8, 0.85, 0.9, 0.95, 0.97, or 0.99), The computing system can disregard or exclude clusters of the plurality of clusters each with a probability of being a TP below the threshold from the plurality of training clusters. The plurality of training clusters can comprise some or all clusters of the plurality of clusters. The computing system can determine for each of the plurality of training clusters an associated probability of the training cluster being a TP. In some embodiments, the computing system can determine centers of each of the plurality of training clusters based on the one or more spots in the training cluster and/or a probability of each of the one or more spots in the training cluster being a TP.

In some embodiments, the computing system can train a machine learning model (e.g., a deep learning model, or a weakly supervised deep learning model) using the training data. The machine learning model can output a plurality of spots with sub-pixel precision. The machine learning model can output a pixel-wise classification prediction of each pixel in an input image containing a spot and a regression prediction of a distance of each pixel in the input image from the nearest spot in the image.

In some embodiments, the computing system can receive one or more input images. The computing system can perform spot detection on each of the one or more input images using the machine learning model. The input image can comprise a fluorescent image. The input image can be generated from a labeled sample. In some embodiments, the training image and the input image are generated using two different spot labeling methods, such as MERFISH, SeqFISH, SplitFISH, In Situ Sequencing, and/or SunTag labeling.

The method 500 ends at block 528.

Machine Learning Model

Machine learning models can be trained using training data generated using generative modeling of the present disclosure. Non-limiting examples of machine learning models includes scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

Once trained, a machine learning model can be stored in a computing system (e.g., the computing system 600 described with reference to FIG. 6). Some examples of machine learning models can include supervised or non-supervised machine learning, including regression models (such as, for example, Ordinary Least Squares Regression), instance-based models (such as, for example, Learning Vector Quantization), decision tree models (such as, for example, classification and regression trees), Bayesian models (such as, for example, Naive Bayes), clustering models (such as, for example, k-means clustering), association rule learning models (such as, for example, a-priori models), artificial neural network models (such as, for example, Perceptron), deep learning models (such as, for example, Deep Boltzmann Machine, or deep neural network), dimensionality reduction models (such as, for example, Principal Component Analysis), ensemble models (such as, for example, Stacked Generalization), and/or other machine learning models.

A layer of a neural network (NN), such as a deep neural network (DNN) can apply a linear or non-linear transformation to its input to generate its output. A neural network layer can be a normalization layer, a convolutional layer, a softsign layer, a rectified linear layer, a concatenation layer, a pooling layer, a recurrent layer, an inception-like layer, or any combination thereof. The normalization layer can normalize the brightness of its input to generate its output with, for example, L2 normalization. The normalization layer can, for example, normalize the brightness of a plurality of images with respect to one another at once to generate a plurality of normalized images as its output. Non-limiting examples of methods for normalizing brightness include local contrast normalization (LCN) or local response normalization (LRN). Local contrast normalization can normalize the contrast of an image non-linearly by normalizing local regions of the image on a per pixel basis to have a mean of zero and a variance of one (or other values of mean and variance). Local response normalization can normalize an image over local input regions to have a mean of zero and a variance of one (or other values of mean and variance). The normalization layer may speed up the training process.

A convolutional neural network (CNN) can be a NN with one or more convolutional layers, such as, 5, 6, 7, 8, 9, 10, or more. The convolutional layer can apply a set of kernels that convolve its input to generate its output. The softsign layer can apply a softsign function to its input. The softsign function (softsign(x)) can be, for example, $(x/(1+|x|))$. The softsign layer may neglect impact of per-element outliers. The rectified linear layer can be a rectified linear layer unit (ReLU) or a parameterized rectified linear layer unit (PReLU). The ReLU layer can apply a ReLU function to its input to generate its output. The ReLU function ReLU(x) can be, for example, max(0, x). The PReLU layer can apply a PReLU function to its input to generate its output. The PReLU function PReLU(x) can be, for example, x if $x \geq 0$ and ax if x<0, where a is a positive number. The concatenation layer can concatenate its input to generate its output. For example, the concatenation layer can concatenate four 5×5 images to generate one 20×20 image. The pooling layer can apply a pooling function which down samples its input to generate its output. For example, the pooling layer can down sample a 20×20 image into a 10×10 image. Non-limiting examples of the pooling function include maximum pooling, average pooling, or minimum pooling.

At a time point t, the recurrent layer can compute a hidden state s(t), and a recurrent connection can provide the hidden state s(t) at time t to the recurrent layer as an input at a subsequent time point t+1. The recurrent layer can compute its output at time t+1 based on the hidden state s(t) at time t. For example, the recurrent layer can apply the softsign function to the hidden state s(t) at time t to compute its output at time t+1. The hidden state of the recurrent layer at time t+1 has as its input the hidden state s(t) of the recurrent layer at time t. The recurrent layer can compute the hidden state s(t+1) by applying, for example, a ReLU function to its input. The inception-like layer can include one or more of the normalization layer, the convolutional layer, the softsign layer, the rectified linear layer such as the ReLU layer and the PReLU layer, the concatenation layer, the pooling layer, or any combination thereof.

The number of layers in the NN can be different in different implementations. For example, the number of layers in a NN can be 10, 20, 30, 40, or more. For example, the number of layers in the DNN can be 50, 100, 200, or more. The input type of a deep neural network layer can be different in different implementations. For example, a layer can receive the outputs of a number of layers as its input. The input of a layer can include the outputs of five layers. As another example, the input of a layer can include 1% of the layers of the NN. The output of a layer can be the inputs of a number of layers. For example, the output of a layer can be used as the inputs of five layers. As another example, the output of a layer can be used as the inputs of 1% of the layers of the NN.

The input size or the output size of a layer can be quite large. The input size or the output size of a layer can be n×m, where n denotes the width and m denotes the height of the input or the output. For example, n or m can be 11, 21, 31, or more. The channel sizes of the input or the output of a layer can be different in different implementations. For example, the channel size of the input or the output of a layer can be 4, 16, 32, 64, 128, or more. The kernel size of a layer can be different in different implementations. For example, the kernel size can be n×m, where n denotes the width and m denotes the height of the kernel. For example, n or m can be 5, 7, 9, or more. The stride size of a layer can be different in different implementations. For example, the stride size of a deep neural network layer can be 3, 5, 7 or more.

In some embodiments, a NN can refer to a plurality of NNs that together compute an output of the NN. Different NNs of the plurality of NNs can be trained for different tasks. A processor (e.g., a processor of the computing system 600 descried with reference to FIG. 6) can compute outputs of NNs of the plurality of NNs to determine an output of the NN. For example, an output of a NN of the plurality of NNs can include a likelihood score. The processor can determine the output of the NN including the plurality of NNs based on the likelihood scores of the outputs of different NNs of the plurality of NNs.

Execution Environment

Figure 6:
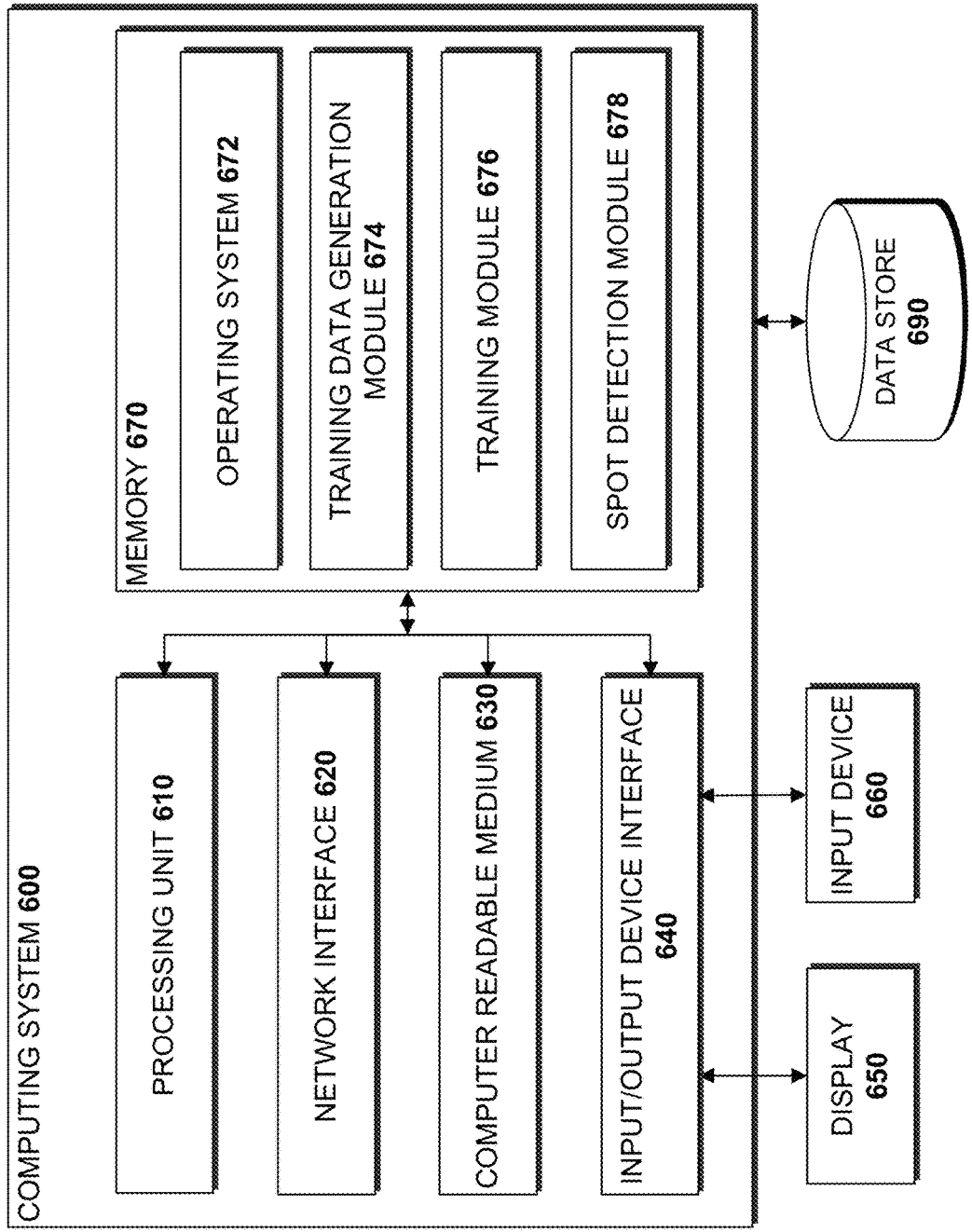
FIG. 6 is a block diagram of an illustrative computing system configured to implement training data generation and machine learning model training.

FIG. 6 depicts a general architecture of an example computing device 600 that can be used in some embodiments to execute the processes and implement the features described herein. The general architecture of the computing device 600 depicted in FIG. 6 includes an arrangement of computer hardware and software components. The computing device 600 may include many more (or fewer) elements than those shown in FIG. 6. It is not necessary, however, that all of these generally conventional elements be shown in order to provide an enabling disclosure. As illustrated, the computing device 600 includes a processing unit 610, a network interface 620, a computer readable medium drive 630, an input/output device interface 640, a display 650, and an input device 660, all of which may communicate with one another by way of a communication bus. The network interface 620 may provide connectivity to one or more networks or computing systems. The processing unit 610 may thus receive information and instructions from other computing systems or services via a network. The processing unit 610 may also communicate to and from memory 670 and further provide output information for an optional display 650 via the input/output device interface 640. The input/output device interface 640 may also accept input from the optional input device 660, such as a keyboard, mouse, digital pen, microphone, touch screen, gesture recognition system, voice recognition system, gamepad, accelerometer, gyroscope, or other input device.

The memory 670 may contain computer program instructions (grouped as modules or components in some embodiments) that the processing unit 610 executes in order to implement one or more embodiments. The memory 670 generally includes RAM, ROM and/or other persistent, auxiliary or non-transitory computer-readable media. The memory 670 may store an operating system 672 that provides computer program instructions for use by the processing unit 610 in the general administration and operation of the computing device 600. The memory 670 may further include computer program instructions and other information for implementing aspects of the present disclosure.

For example, in one embodiment, the memory 670 includes a training data generation module 674 for generating training data using generative modeling. The memory 670 may additionally or alternatively include a training module 676 for training a machine learning model using training data generated using generative modeling. The memory 670 may additionally or alternatively include a spot detection module 678 for detecting spots using a machine learning model trained using training data generative using generative modeling. In addition, memory 670 may include or communicate with the data store 690 and/or one or more other data stores that store, for example, training data, a machine learning model, one or more input images, and/or one or more outputs of the machine learning model.

Additional Considerations

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

One skilled in the art will appreciate that, for this and other processes and methods disclosed herein, the functions performed in the processes and methods can be implemented in differing order. Furthermore, the outlined steps and operations are only provided as examples, and some of the steps and operations can be optional, combined into fewer steps and operations, or expanded into additional steps and operations without detracting from the essence of the disclosed embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. As used in this specification and the appended claims, the singular forms "a," "an," and "the" include plural references unless the context clearly dictates otherwise. Accordingly, phrases such as "a device configured to" are intended to include one or more recited devices. Such one or more recited devices can also be collectively configured to carry out the stated recitations. For example, "a processor configured to carry out recitations A, B and C can include a first processor configured to carry out recitation A and working in conjunction with a second processor configured to carry out recitations B and C. Any reference to "or" herein is intended to encompass "and/or" unless otherwise stated.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

It will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for generating training data for spot detection comprising:
    under control of a hardware processor:
        receiving a training image;
        detecting a plurality of spots on the training image using a first spot detection method;
        detecting a plurality of spots on the training image using a second spot detection method;
        clustering spots of pluralities of spots to generate a plurality of clusters each comprising one or more spots of the pluralities of spots;
        iteratively determining a true positive rate (TPR) and a false positive rate (FPR) for each of the spot detection methods until the TPR of the spot detection method converge and the FPR of the spot detection method converge, comprising, in each iteration:
            for each of the plurality of clusters, determining a probability of the cluster being a true positive (TP) and a probability of the cluster being a false positive (FP) using a TPR and a FPR of the spot detection method, wherein the TPR and the FPR are an initial true positive rate (TPR) and an initial false positive rate (FPR), respectively, or a TPR and a FPR determined from a prior iteration, respectively;
            determining (i) an expectation value of the cluster being a TP, (ii) an expectation value of the cluster being a false negative (FN), (iii) an expectation value of the cluster being a FP, and (iv) an expectation value of the cluster being a true negative (TN) using the probability of the cluster being a TP and the probability of the cluster being a FP and whether the cluster comprises a spot of the plurality of spots determined using the spot detection method;
            determining (i) an expectation value of a total number of TPs, (ii) an expectation value of a total number of FNs, (iii) an expectation value of a total number of FPs, and (iv) an expectation value of a total number of TNs using the expectation values of each of the plurality of clusters being a TP, a FN, a FP, and a TN; and
            determining a TPR and a FPR for spot detection method for the iteration using the expectation values of the total numbers of TPs, FNs, FPs, and TNs; and
        generating training data comprising the training image and a plurality of training clusters comprising clusters of the plurality of clusters.

2. A method for generating training data for spot detection comprising:
    under control of a hardware processor:
        receiving a plurality of training images;
        for each training image:
            detecting a plurality of spots on the training image using a first spot detection method;
            detecting a plurality of spots on the training image using a second spot detection method;
            clustering spots of pluralities of spots to generate a plurality of clusters each comprising one or more spots of the pluralities of spots;
            performing generative modeling with expectation maximization to determine a true positive rate (TPR) and a false positive rate (FPR) for each of the spot detection methods; and
        generating training data comprising the plurality of training images and a plurality of training clusters comprising clusters of the plurality of clusters for each of the plurality of images.

3. The method of claim 2, wherein performing generative modeling with expectation maximization comprises: iteratively determining a TPR and a FPR for each of the spot detection methods until the TPR of the spot detection method converge and the FPR of the spot detection method converge.

4. The method of claim 3, wherein performing generative modeling with expectation maximization comprises:
    (a) for each of the spot detection methods:
        for each of the plurality of clusters:
            (a1) determining a probability of the cluster being a true positive (TP) and a probability of the cluster being a false positive (FP) using a TPR and a FPR of the spot detection method, wherein the TPR and the FPR are an initial true positive rate (TPR) and an initial false positive rate (FPR), respectively, or a TPR and a FPR determined from a prior iteration, respectively;
            (a2) determining (i) an expectation value of the cluster being a TP, (ii) an expectation value of the cluster being a false negative (FN), (iii) an expectation value of the cluster being a FP, and (iv) an expectation value of the cluster being a true negative (TN) using the probability of the cluster being a TP and the probability of the cluster being a FP and whether the cluster comprises a spot of the plurality of spots determined using the spot detection method;
            (a3) determining (i) an expectation value of a total number of TPs, (ii) an expectation value of a total number of FNs, (iii) an expectation value of a total number of FPs, and (iv) an expectation value of a total number of TNs using the expectation values of each of the plurality of clusters being a TP, a FN, a FP, and a TN; and (a4) determining a TPR and a FPR for the spot detection method for the iteration using the expectation values of the total numbers of TPs, FNs, FPs, and TNs; and (b) repeating step (a) until the TPR of the spot detection method converge and the FPR of the spot detection method converge.

5. The method of claim 1, wherein the TPR of the spot detection method converge and the FPR of the spot detection method converge when the TPR of the current iteration and the TPR of the prior iteration differ by less than 0.01 and when the FPR of the current iteration and the FPR of the prior iteration differ by less than the threshold.

6. The method of claim 1,
wherein if a cluster of the plurality of clusters comprises a spot of the plurality of spots detected using the spot detection method, the expectation values of the cluster being (i) a TP, (ii) a FN, (iii) a FP, and (iv) a TN are (i) the probability of the cluster being a TP, (ii) 0, (iii) the probability of the cluster being a FP, (iv) 0, respectively, and
wherein if the cluster does not comprise a spot of the plurality of spots detected using the spot detection method, the expectation values of the cluster being (i) a TP, (ii) a FN, (iii) a FP, and (iv) a TN are (i) 0, (ii) the probability of the cluster being a TP, (iii) 0, and (iv) the probability of the cluster being a FP, respectively.

7. The method of claim 1, wherein the training image comprises a fluorescent image, and wherein receiving the training image comprises: generating the training image from a labeled sample.

8. The method of claim 1, further comprising:
generating and displaying a graphical user interface (GUI) comprising (i) the training image overlaid with graphical representations of the plurality of spots, and (ii) one or more parameters of the spot detection method used to detect the plurality of spots;
receiving one or more updated parameters;
performing spot detection on the training image using the spot detection method and the one or more updated parameters to generate a plurality of updated spots; and
generating and displaying a GUI comprising (i) the training image overlaid with graphical representations of the plurality of updated spots, and (ii) the one or more updated parameters.

9. The method of claim 1, further comprising detecting a plurality of spots on the training image using a third spot detection method.

10. The method of claim 1, wherein the spot detection method comprises peak local maximum, Laplacian of Gaussian, difference of Gaussian, Determinant of Hessian, h-dome detection, and/or Crocker-Grier centroid finding.

11. The method of claim 1, wherein clustering the spots comprises: clustering the spots of pluralities of spots to generate the plurality of clusters each comprising one or more spots of the pluralities of spots based on locations of the spots.

12. The method of claim 1, wherein each of the plurality clusters comprises at most one spot from each of the pluralities of spots.

13. The method of claim 1, further comprising: receiving the initial TPR and the initial FPR for one, one or more, or each of the plurality of spot detection methods.

14. The method of claim 1, further comprising: determining the initial TPR and the initial FPR for one, one or more, or each of the plurality of spot detection methods.

15. The method of claim 1, wherein training clusters of the plurality of training clusters have sub-pixel precision.

16. The method of claim 1, further comprising: generating the plurality of training clusters comprising clusters of the plurality of clusters for the training image.

17. The method of claim 1, further comprising: training a machine learning model using the training data, optionally wherein the machine learning model comprises a deep learning model.

18. A system for spot detection comprising:
non-transitory memory configured to store:
executable instructions, and
a machine learning model, wherein the machine learning model is trained using training data comprising a plurality of training images and a plurality of training clusters on each of the plurality of training images, wherein the plurality of training clusters is generated based on (a) a plurality of clusters each comprising one or more spots of pluralities of spots on a training image, wherein a first plurality of spots of the pluralities of spots is detected on the training image using a first spot detection method and a second plurality of spots of the pluralities of spots is detected on the training image using a second spot detection method and (b) generative modeling with expectation maximization on the plurality of clusters which determines a true positive rate (TPR) and a false positive rate (FPR) for each of the plurality of spot detection methods for the training image; and
a hardware processor in communication with the non-transitory memory, the hardware processor programmed by the executable instructions to perform:
receiving an input image;
performing spot detection on the input image using the machine learning model.

19. The system of claim 18, wherein outputs of the machine learning model comprise a plurality of spots with sub-pixel precision and/or a center of one, one or more, or each of the plurality of spots.

20. The system of claim 18, wherein outputs of the machine learning model comprise a pixel-wise classification prediction of each pixel in an input image containing a spot and a regression prediction of a distance of each pixel in the input image from the nearest spot in the image.

* * * * *